(No Model.)

C. E. SKINNER.
ELECTRICAL ADVERTISING APPARATUS.

No. 562,429. Patented June 23, 1896.

WITNESSES:
Ethan T. Dodd
Hubert C. Tener

INVENTOR,
Charles E. Skinner
BY Terry and MacKaye
ATTORNEYS.

ANDREW B. GRAHAM, PHOTO-LITHO, WASHINGTON, D.C.

UNITED STATES PATENT OFFICE.

CHARLES E. SKINNER, OF PITTSBURG, PENNSYLVANIA.

ELECTRICAL ADVERTISING APPARATUS.

SPECIFICATION forming part of Letters Patent No. 562,429, dated June 23, 1896.

Application filed February 28, 1894. Serial No. 501,767. (No model.)

*To all whom it may concern:*

Be it known that I, CHARLES E. SKINNER, a citizen of the United States, residing at Pittsburg, in the county of Allegheny and State of Pennsylvania, have invented a new and useful Improvement in Electrical Advertising Apparatus, (Case No. 574,) of which the following is a specification.

My invention relates to an advertising device of a nature to attract attention by production of light and sound, while exciting curiosity and increased interest by the comparatively unknown nature of the causes at work. The elements employed by me for this purpose are shown in their proper relation in the accompanying drawings, in which—

Figure 1:
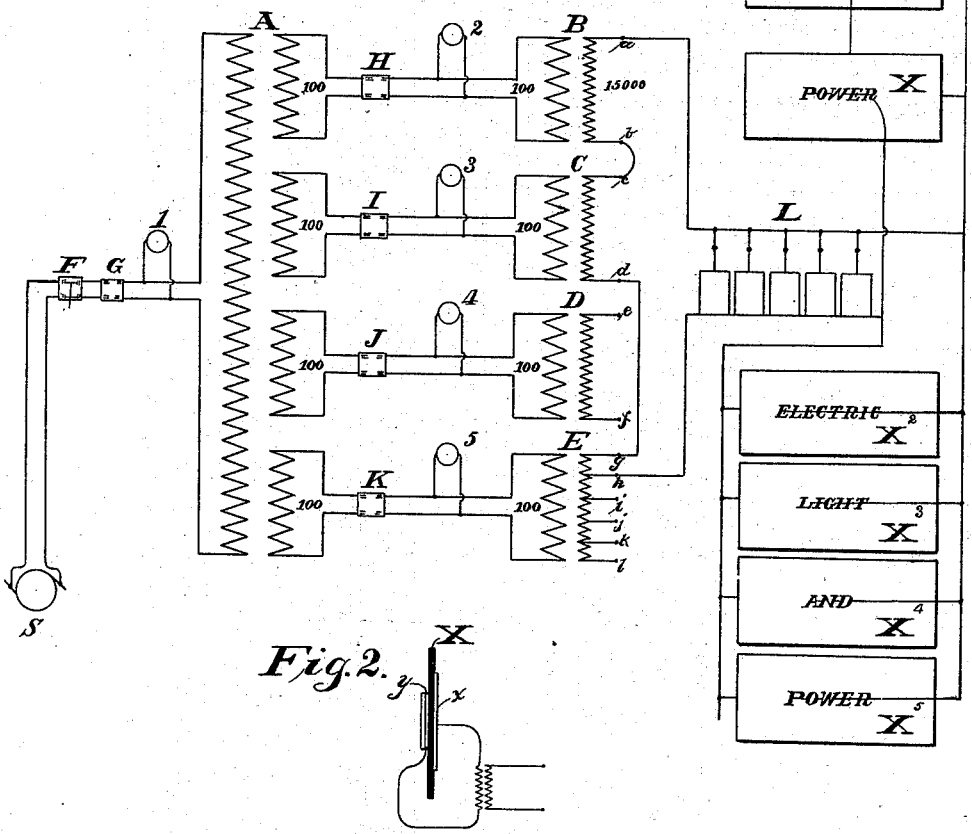
Figure 2:
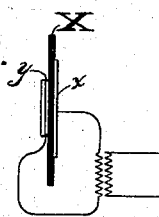
Figure 3:
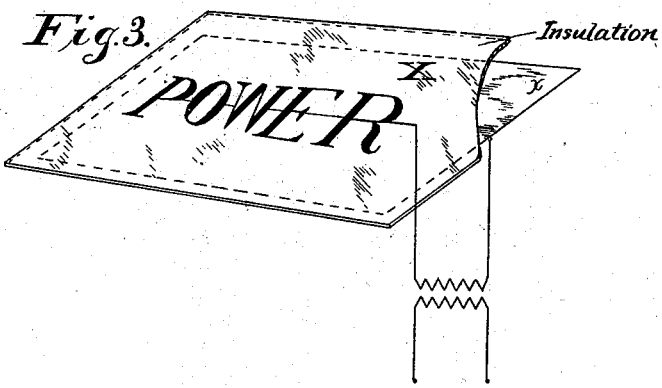

Figure 1 is a diagrammatic representation of my advertising apparatus. Fig. 2 is a side elevation of one of my advertising-boards; and Fig. 3, a perspective view of the same, a portion of one corner being broken away.

I employ any source of alternating current S, say at one hundred volts. This current, after passing through the usual switch F and fuse-block G, is made to pass through the primary of a main converter A, as shown.

For imparting greater flexibility to the system employed, I prefer the arrangement shown in the drawings, wherein a main or distributing converter A and raising-converters B, C, D, and E are used. Of course, if desired, the main converter could be used as the raising-converter, or, where an alternating current of extremely high potential is available, it is even conceivable that my invention could be used without any converter.

1, 2, 3, 4, and 5 are incandescent lamps connected across the respective one-hundred-volt circuits.

In the form preferred by me, and which I have herein illustrated, I employ the main converter A to distribute the secondary current in a number of circuits, say four, herein shown as passing through the switches H, I, J, and K. The currents in these circuits may be of any desired potential. I have indicated one hundred volts for each. Each of these secondary currents is employed as primary current in converters B, C, D, and E. These are raising-converters, and, as indicated, raise the potential from one hundred to fifteen thousand volts in each converter. This is, of course, merely an example of the ratio of conversion which might be used. This ratio depends upon the area of sign to be illuminated and upon the potential of the original current utilized. These converters are insulated from each other, preferably by means of blocks of wood and paraffin, and they may be either on the same core or upon different cores. More or less of the secondaries of these converters are adapted to be used in series, according to the requirements of the sign to be illuminated, the terminals of the secondaries being indicated at $a, b, c, d, e, f, g$, and $l$. Also one or more of the secondaries may be subdivided, as shown at $h\ i\ j\ k$ in converter E. This is to impart increased flexibility to the system. As shown, the secondaries of converters B and C are in series with one of the subdivisions of converter E, but many other arrangements of the apparatus shown may of course be used, if desired. The current produced by these high-voltage secondaries is directly employed in producing the advertising-signs illuminated according to my invention.

As shown in Fig. 2, an insulating body or plate X, formed of glass, hard rubber, or other suitable material, is provided with a backing plate or body of conducting material $x$, such, for example, as tin-foil. Upon the front of the plate $x$ are placed the letters of the sign making any desired words, as indicated at X, X', $X^2$, $X^3$, $X^4$, and $X^5$ in Figs. 1 and 3. Of course designs of any kind formed either of letters or other characters or figures may be thus utilized. These letters are either made of conducting-plates, and connected together in series, or are provided with backing plates or strips, as shown most clearly at $y$ in Fig. 2.

While the letters or characters constituting the sign may be placed upon a single strip of conducting material, I prefer to make a separate backing for each letter or character and connect such backing-strips in series, since the sign is brought out more clearly and distinctly by this means.

When the terminals of the secondaries of the raising-converter are respectively attached to the rear and front conducting-plates of the sign as shown, a discharge will take place from the smaller plate or plates which is in the nature of an electrical bombardment and which spreads out over the face of the insulating-plate. This discharge varies in degree between loud, crackling sparks and a gentle, noiseless glow, depending upon the potential. The letters of the sign are thus brought out in high relief, and attract immediate attention to the announcement made thereby.

Although the current from the raising-converter secondaries may be used without auxiliary devices, I have found it advisable to introduce a large-capacity condenser or condensers L in shunt with the signs X X', &c. These condensers increase the violence of discharge at a given potential and frequency of alternations.

Of course the production of high-tension alternating currents of any desired frequency is possible of attainment by many different means, and while I have shown specific means for producing the same, I do not intend to limit myself to these means or to any one of them.

My invention covers, broadly, any suitable means for the production and utilization of high-tension alternating currents for advertising purposes in substantially the manner set forth, irrespective of the form, dimensions, and relative arrangement of the devices employed.

What I claim is—

1. Means for producing a high-tension alternating current, in combination with two conducting-bodies in proximity to each other, an interposed body of insulating material and advertising letters or designs located in or upon one of said conducting-bodies, said conducting-bodies being respectively connected with the terminals of said current-producing means, substantially as described.

2. An insulating sign-board, a conducting plate or plates on each side thereof, and letters or designs on one side of said board, in combination with a source of high-tension alternating current having its respective terminals connected with the plates on the two sides of said board, substantially as described.

3. Two conducting-bodies in proximity to each other, an interposed body of insulating material and advertising-letters located in or adjacent to one of said conducting-bodies in combination with a source of alternating current, a converter for raising the potential thereof, and connections between the terminals of the respective high-tension coils of said converter and said two conducting-bodies, substantially as described.

4. In an advertising device, the combination with two adjacent conducting-plates insulated from each other, of a source of alternating current, a number of raising-converters supplied therefrom, said converters being insulated from each other, and means for connecting more or less of said converters or parts thereof in series, substantially as described.

5. A source of alternating current, a distributing-converter having a number of secondaries producing separate secondary currents, a series of raising-converters respectively supplied by said secondaries, two conducting-bodies separated by insulating material and connected respectively with the terminals of a circuit which includes more or less of the secondaries of said raising-converters connected in series, and advertising letters or designs located in or upon one of said conducting-bodies, substantially as described.

6. A source of alternating current, a distributing-converter having a number of secondaries producing separate secondary currents, a series of raising-converters respectively supplied by said secondaries, two sets of conducting-bodies separated by insulating material and connected respectively to the two sides of the circuit which includes more or less of the secondaries of said raising-converters connected in series, advertising letters or designs located in or upon one of said sets of conducting-bodies, and a condenser in shunt to said sets of conducting-bodies, substantially as described.

7. Two sets of insulated conducting-bodies disposed to display advertising letters or designs, in combination with a source of alternating current and conductors connecting said bodies with said source, substantially as described.

In testimony whereof I have hereunto subscribed my name this 24th day of February, A. D. 1894.

CHARLES E. SKINNER.

Witnesses:
JAMES WM. SMITH,
HUBERT C. TENER.